United States Patent [19]
Aoyama et al.

[11] Patent Number: 5,636,613
[45] Date of Patent: Jun. 10, 1997

[54] CYLINDER HEAD PORTING ARRANGEMENT FOR MULTI-VALVE ENGINE

[75] Inventors: Tateo Aoyama; Masato Nishigaki; Takashi Hara; Masami Wada, all of Iwata, Japan

[73] Assignee: Yamaha Hatsudoki Kabushiki Kaisha, Iwata, Japan

[21] Appl. No.: 555,528

[22] Filed: Nov. 9, 1995

[30] Foreign Application Priority Data

Nov. 10, 1994 [JP] Japan .................................. 6-276479

[51] Int. Cl.⁶ .................................................. F02B 15/00
[52] U.S. Cl. ............................................................ 123/432
[58] Field of Search ............................. 123/432, 336, 123/337, 308, 184.14, 184.55

[56] References Cited

U.S. PATENT DOCUMENTS

| | | | |
|---|---|---|---|
| 5,454,357 | 10/1995 | Elder | 123/337 |
| 5,477,823 | 12/1995 | Uchida | 123/308 |
| 5,526,789 | 6/1996 | Stein et al. | 123/432 |
| 5,551,393 | 9/1996 | Amano et al. | 123/306 |

*Primary Examiner*—Raymond A. Nelli
*Attorney, Agent, or Firm*—Knobbe, Martens, Olson & Bear LLP

[57] ABSTRACT

A number of embodiments of three valve per cylinder engines which permit effective running under all engine running conditions by controlling the flow to some of the intake ports and by redirecting the flow, in some instances to other intake ports. A wide variety of control valves and fuel injector arrangements are also disclosed.

37 Claims, 12 Drawing Sheets

CYLINDER HEAD PORTING ARRANGEMENT FOR MULTI-VALVE ENGINE

BACKGROUND OF THE INVENTION

This invention relates to an internal combustion engine and more particularly to an improved cylinder head porting and fuel injection arrangement for multi-valve engines.

It is well known that the performance of an engine is quite dependent upon the configuration and functioning of its induction system. However, the requirements of the induction system vary significantly as the running condition of the engine varies. At low speeds and at idle it is desirable to have the intake charge enter the combustion chamber at a relatively high velocity and in a pattern which will effect turbulence in the combustion chamber.

This turbulence is desirable in order to ensure rapid flame propagation which is necessary for complete combustion. In addition, it may be desirable to provide an arrangement wherein the charge in the combustion chamber is stratified so that a homogenous mixture need not fill the combustion chamber in order to have it burn. Stratification is a particularly difficult problem to accomplish in an open chamber engine unless the path of the air flow entering the combustion chamber can be accurately and tightly controlled.

On the other hand, under high speed/high load conditions, it is desirable to have the charge enter the combustion chamber in a relatively unencumbered fashion.

In order to obtain high flow velocities at low speeds, it is necessary to restrict the cross-sectional area of the intake passage. However, such restricted passages seriously and adversely effect the breathing capacity of the engine and reduce its high speed output. In addition, the turbulence generating devices normally used also restrict airflow and adversely effect high speed/high load conditions.

Therefore, induction systems have been proposed which, in effect, are split-type induction systems. That is, the induction system is tuned and sized so as to provide a high speed turbulent airflow at low and mid-range and a larger unrestricted flow under high speed/high load conditions. These goals can be accomplished by utilizing separate inlet passages for each of plural valves in the combustion chamber and controlling the flow so that only one passage primarily serves the combustion chamber at low speeds and at mid-range and both passages serve the combustion chamber at high speed/high load. This type of arrangement generally requires separate independent passages each serving a respective intake port.

In order to achieve stratification and better fuel control, the use of port-type fuel injection is resorted to. However, if a port-type injector is employed and separate intake passages are provided for each intake port of the engine, then multiple fuel injectors may be required. This obviously adds to the cost of the engine.

It is, therefore, a principal object of this invention to provide an improved multi-port intake passage for an engine that permits separate tuning and yet which can operate with a single fuel injector.

The aforenoted techniques for providing split induction systems are particularly advantageous in engines having two intake valves per cylinder. With such arrangements, the intake valves are symmetrically placed and if one intake port has its flow restricted or shutoff, the resulting flow will tend to generate swirl in the combustion chamber which promotes turbulence. However, there are instances when other types of turbulence generating systems are required. Specifically, swirl is a motion of the air in the intake chamber which takes place around the axis of the cylinder bore. However, it has been found that under some running conditions another type of swirling motion is more effective. This type of swirl occurs around an axis that extends transversely to the cylinder bore and is frequently referred to as "tumble."

The advantage of using tumble is that the rate of swirl actually increases as the piston approaches top dead center, at the time approaching ignition, because the swirling path is shorter and hence the velocity becomes higher. Conventional swirl tends to dissipate at this time, however. In addition, this type of motion (tumble) has other advantages over swirl with at least some engines and under at least some running conditions. Tumble is more difficult to achieve in a multi-valve engine.

It is, therefore, a still further object of this invention to provide an improved multi-port, split induction, internal combustion engine wherein tumble can be generated easily.

As has been noted, it is very desirable to use multiple intake valves to improve engine performance particularly at the high speed/high load range. Although two intake valves per cylinder are normally used for this purpose, it has been recognized that the use of three intake valves permits even greater increases in engine performance.

When three intake valves per cylinder are utilized, it is the normal practice to provide one center intake valve that is disposed further from a plane containing a cylinder bore axis with a pair of side intake valves disposed on opposite sides of this center intake valve and close to the plane. In fact and at times, the one or both of the side intake valves may extend over this plane onto the exhaust side of the engine. Such valve placement, however, makes it difficult at times to provide the type of tuning and turbulence previously referred to.

It is, therefore, a principal object to provide an improved induction system for an engine having three intake valves per cylinder.

It is a further object of this invention to provide an improved three intake valve engine wherein the induction system can be tuned to provide optimum running under all conditions.

It is a further object of this invention to provide an improved control arrangement for a three valve per cylinder engine that can achieve the desired degree of turbulence under low speed and low loads and maximum output under high speed/high load conditions.

If three separate intake passages are utilized in a three valve per cylinder engine, then the problems of the number of fuel injectors employed also is present. That is, the problems of this concept are greater with three separate intake passages than with two as should be obvious.

It is, therefore, a still further object of this invention to provide an improved variable tuned, three valve per cylinder engine wherein the number of fuel injectors are minimized and wherein stratification may be obtained if desired.

The placement of the three intake valves as aforedescribed also makes the generation of tumble in the combustion chamber more difficult. In some regards, tumble has more advantages in three intake valve engines than two intake valve engines. However, because the center intake valve is placed further from the plane that passes through the center of the combustion chamber, the center intake valve tends to generate a tumble in the combustion chamber which is counter to the tumble generated by one or both of the side intake valves. Therefore, the actions may conflict with each other and make it difficult to obtain the desired flow patterns under all running conditions.

It is, therefore, a still further object of this invention to provide an improved intake port arrangement for a three valve per cylinder engine wherein each of the intake ports is configured and tuned separately from the others.

SUMMARY OF THE INVENTION

A first feature of the invention is adapted to be embodied in an internal combustion engine having a combustion chamber served by at least two intake ports. A pair of intake passages separated by a wall each terminates at a respective one of the intake ports. A fuel injector is positioned for discharging only into one of the intake passages in a direction generally along the flow axis of that one intake passage. An opening is formed in the wall and extends between the intake passages at a point upstream of the intake ports and downstream of the point of discharge from the fuel injector. A control valve is provided in the other intake passage for restraining the flow therethrough upstream of the wall thus causing at least some of the air flowing through the one intake passage to pass through the opening and sweep fuel with this air to the other intake port.

A second feature of the invention is also adapted to be embodied in an internal combustion engine. Such an engine has a combustion chamber formed at least in part by a cylinder block having a cylinder bore, a piston reciprocating in the cylinder bore and a cylinder head having a recessed surface facing and closing the cylinder bore. Three intake ports are formed in the recess for admitting a charge into the combustion chamber. These intake ports are comprised of a center intake port spaced from a plane containing the axis of the cylinder bore and first and second side intake ports formed on opposite sides of the center intake port. These side intake ports are positioned closer to the first plane than the center intake port. The intake ports are each served by a respective intake passage which has a first portion extends at an acute angle to the plane. Each of these first portions terminates in a short second portion that extends generally perpendicularly to the respective intake port. At least one of the acute angles of the first portion and the length of the second portion of each of the side intake passages is different from that of the other side intake passage.

A third feature of the invention is also adapted to be embodied in an internal combustion engine. Such an engine has a combustion chamber formed at least in part by a cylinder block having a cylinder bore, a piston reciprocating in the cylinder bore and a cylinder head having a recessed surface facing and closing the cylinder bore. Three intake ports are formed in the recess for admitting a charge into the combustion chamber. These intake ports are comprised of a center intake port spaced from a first plane containing the axis of the cylinder bore and first and second side intake ports formed on opposite sides of the center intake port. These side intake ports are positioned closer to the first plane than the center intake port. A first intake passage extends through the cylinder head and terminates at the first side intake port. A second intake passage extends through the cylinder head in side-by-side relationship to the first intake passage and terminates at the center intake port and the second side intake port. The first and second intake passages are separated by a wall of the cylinder head. An opening is formed in the wall and a fuel injector has a discharge nozzle disposed contiguous to the opening and sprays fuel into each of the intake passages.

A fourth feature of the invention is also adapted to be embodied in an internal combustion engine. Such an engine has a combustion chamber formed at least in part by a cylinder block having a cylinder bore, a piston reciprocating in the cylinder bore and a cylinder head having a recessed surface facing and closing the cylinder bore. Three intake ports are formed in the recess for admitting a charge into the combustion chamber. These intake ports are comprised of a center intake port spaced from a plane containing the axis of the cylinder bore and first and second side intake ports formed on opposite sides of the center intake port. These side intake ports are positioned closer to the plane than the center intake port. Intake passage means extend through the cylinder head and terminates at the intake ports for delivering a charge to the combustion chamber. First and second fuel injectors are provided for spraying fuel into the intake passage means. Each of the fuel injectors has a spray pattern that is different from the other.

DETAILED DESCRIPTION OF THE PREFERRED EMBODIMENTS OF THE INVENTION

Figure 1:
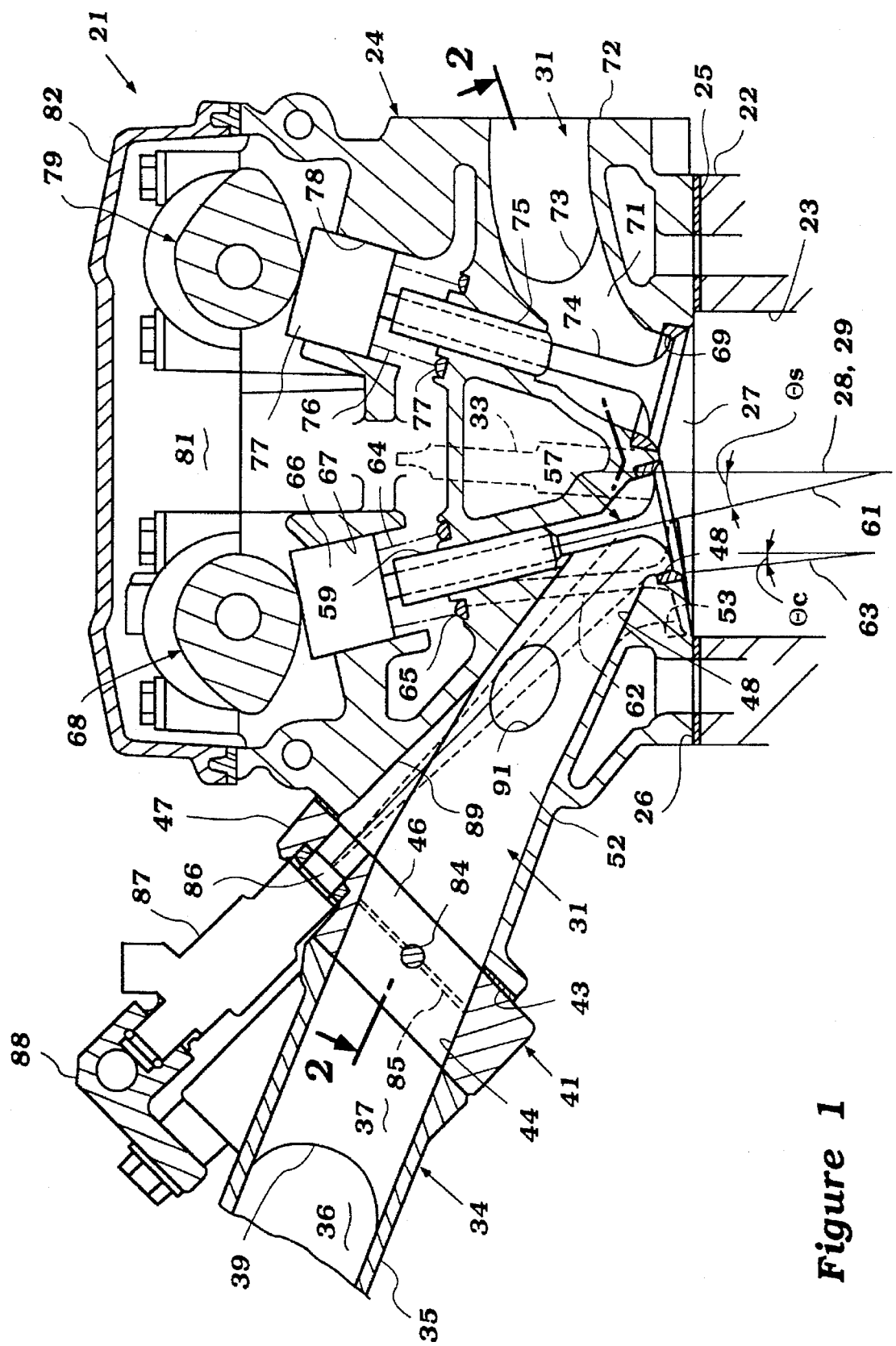
FIG. 1 is a cross-sectional view taken through a single cylinder of a multiple cylinder internal combustion engine constructed in accordance with a first embodiment of the invention and along the line 1—1 of FIG. 2.
Figure 2:
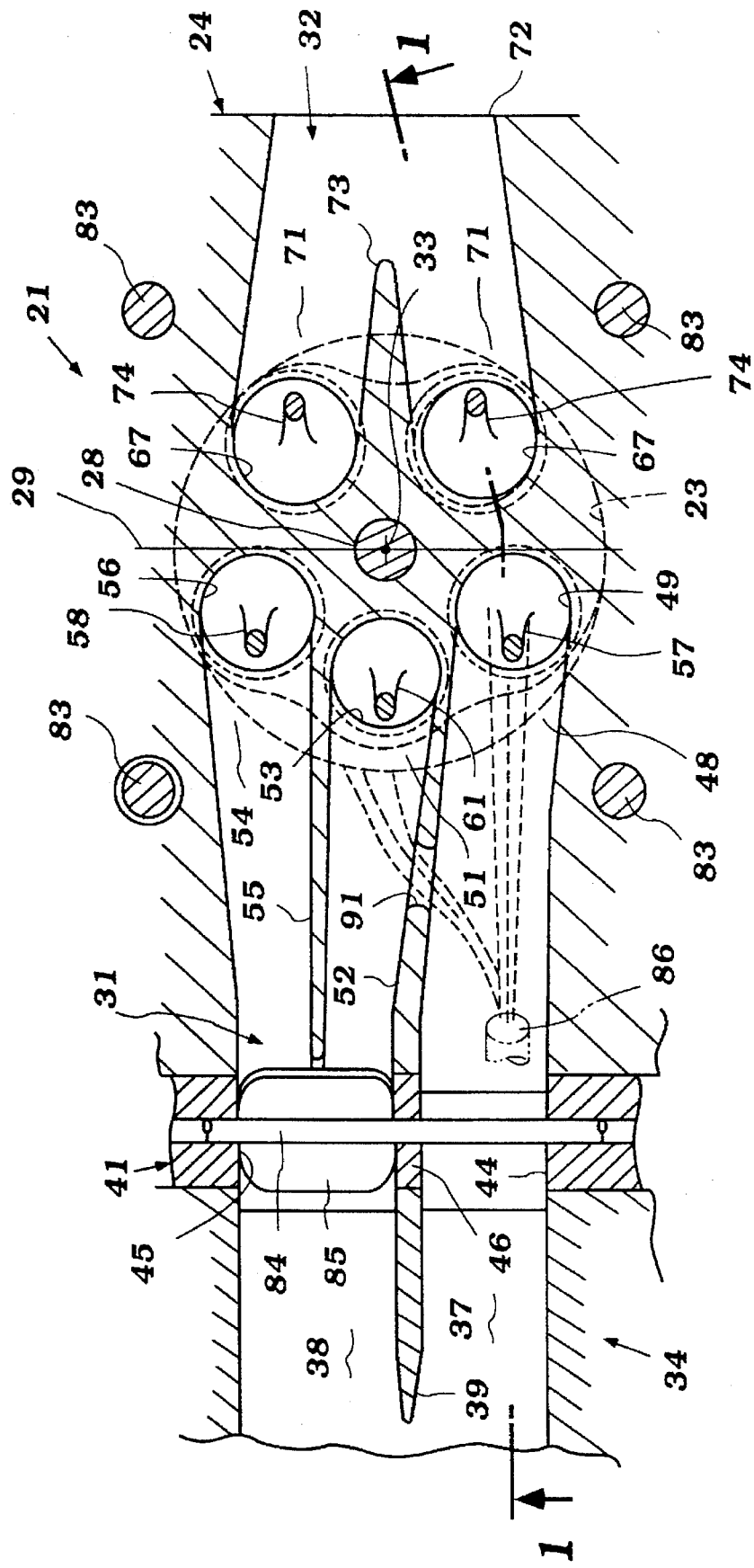
FIG. 2 is a cross-sectional view taken through the intake and exhaust passages of the cylinder and is taken along the line 2—2 of FIG. 1.
Figure 3:
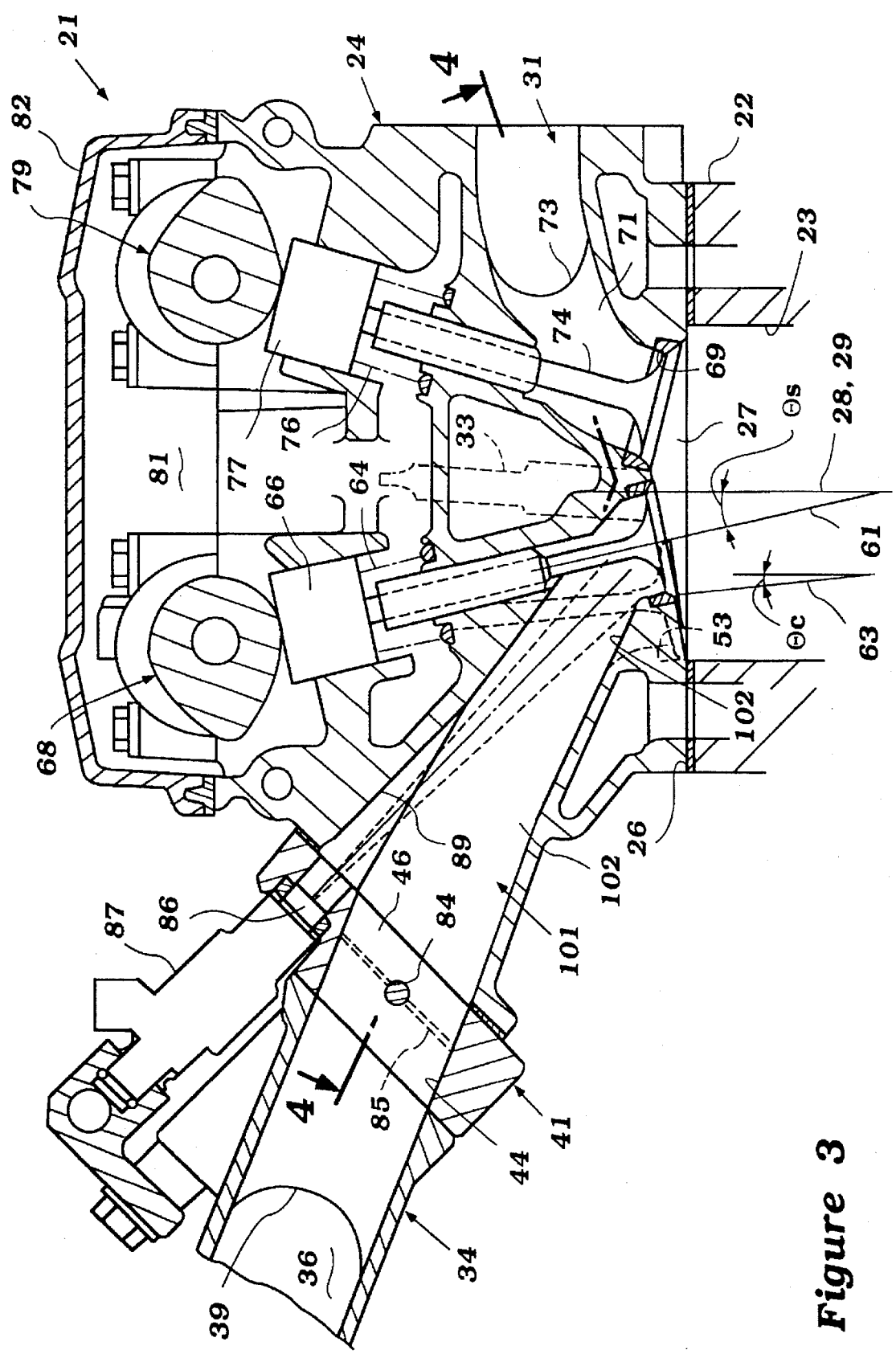
FIG. 3 is a cross-sectional view taken along the line 3—3 of FIG. 4., in part similar to FIG. 1, but shows another embodiment of the invention.
Figure 4:
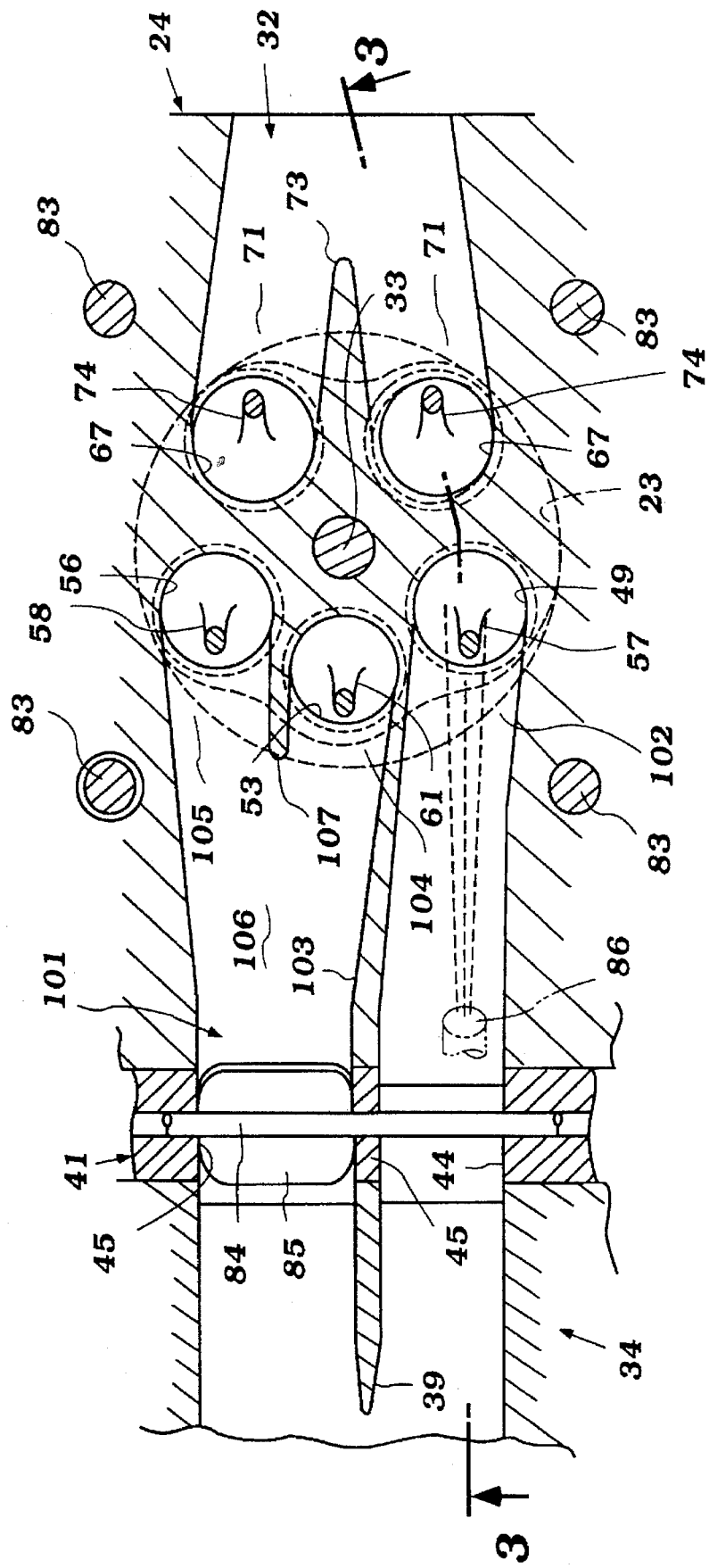
FIG. 4 is a cross-sectional view, in part similar to FIG. 2, and is taken along the line 4—4 of FIG. 3.
Figure 5:
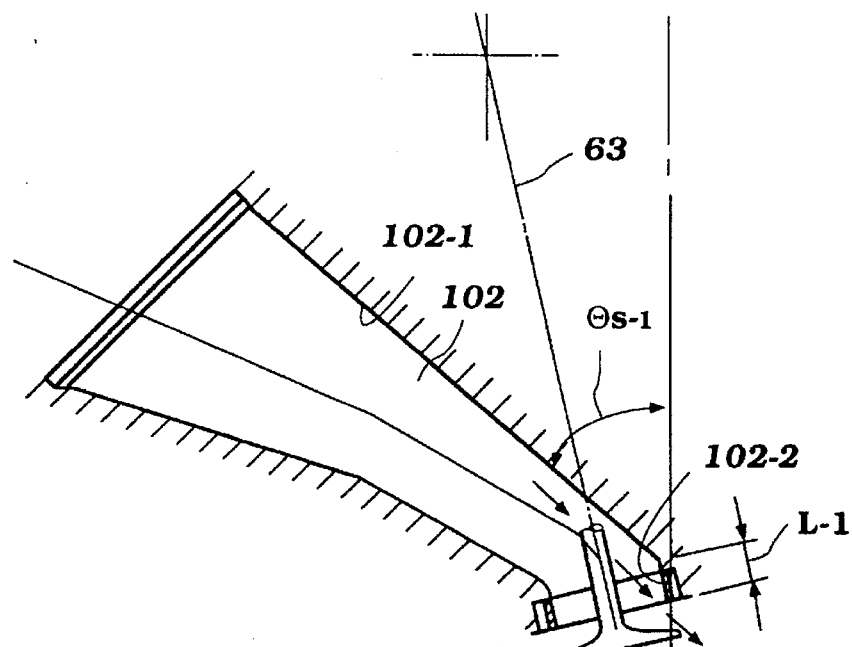
FIG. 5 is a cross-sectional view taken through the first of the side intake passages of this embodiment.
Figure 6:
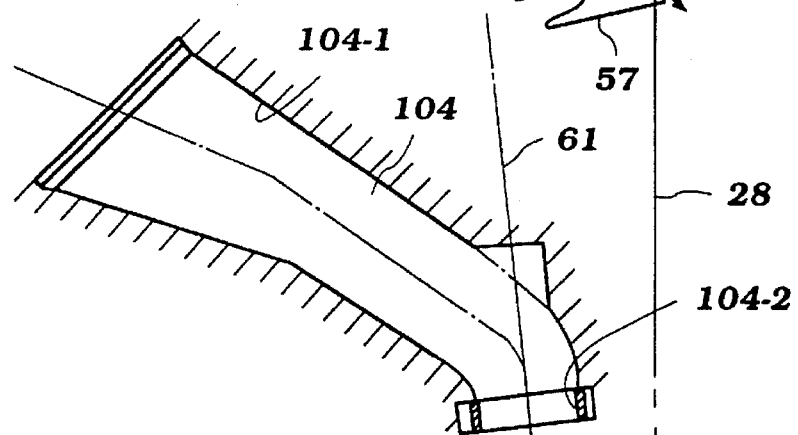
FIG. 6 is a cross-sectional view taken through the center intake passage of this embodiment.
Figure 7:
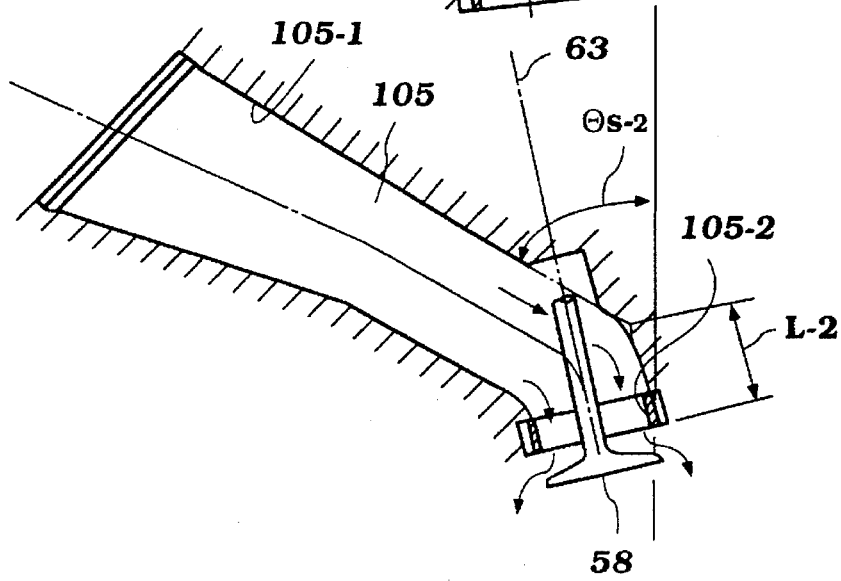
FIG. 7 is a cross-sectional view taken through the second side intake passage of this embodiment.
Figure 8:
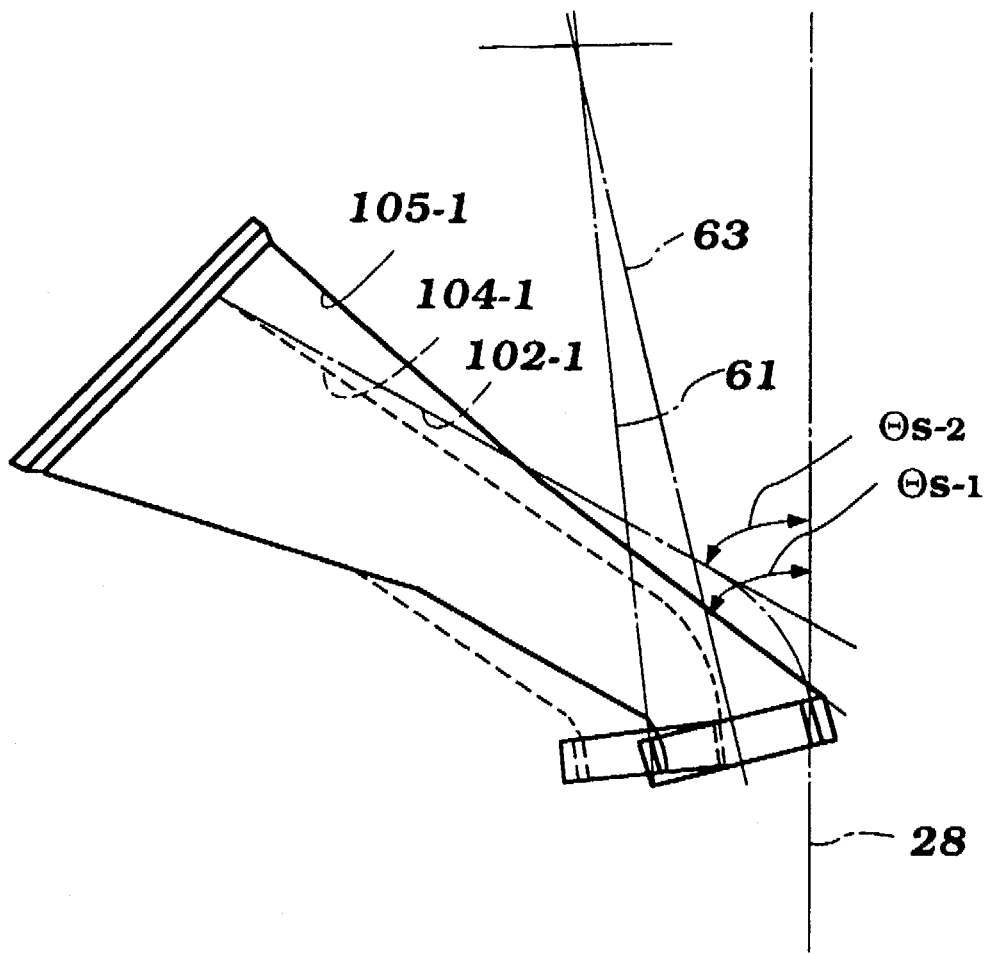
FIG. 8 is a view which constitutes a superimposed view showing the three intake passages so that their relative configurations can be best understood.

Referring now in detail to the drawings and initially to the embodiment of FIGS. 1 and 2, an internal combustion engine constructed in accordance with this embodiment is shown partially and in two cross-sectional views. The engine is identified generally by the reference numeral 21.

Since the invention deals primarily with the induction system for the engine, only the upper portion of the engine for one of its combustion chambers is illustrated. Where any component of the engine 21 is not illustrated or described, it may be assumed that any conventional type structure may be utilized. Also and for the same reasons, only a single of the engine is shown because those skilled in the art will readily understand how the invention may be applied to engines having other numbers of cylinders and any cylinder orientation.

The engine 21 is comprised of a cylinder block 22 which has a plurality of cylinder bores, only one being shown and identified by the reference numeral 23. Pistons (not shown) reciprocate in the cylinder bores 23 and are connected to the crankshaft of the engine in a well known manner, which for reasons already mentioned is not illustrated.

A cylinder head assembly, indicated generally by the reference numeral 24 is affixed to the cylinder block 22 in a known manner. The cylinder head 24 has a lower sealing surface 25 that is sealingly engaged with the cylinder block 22 or an interposed cylinder head gasket 26. The cylinder head surface 25 surrounds a plurality of recesses 27 which cooperate with the respective cylinder bores 23 and the heads of the pistons to form the combustion chambers of the engine. At times, the recesses 27 will be referred to as the combustion chamber since at top dead center the substantial portion of the clearance volume is formed by these recesses.

The cylinder bore 23 is cylindrical in a preferred form of the invention and has a cylinder bore axis indicated by the line 28. This line 28 also defines a plane, indicated by the reference numeral 29 that in essence divides the cylinder head into an intake side and an exhaust side. On the intake side, an induction passage arrangement, indicated generally by the reference numeral 31 is provided. On the exhaust side an exhaust passage arrangement, indicated generally by the reference numeral 32 is provided.

A spark plug 33 is mounted in the cylinder head 24 in a known manner and has its gap lying substantially on the cylinder bore axis 28.

Referring now to the induction side of the engine and specifically the intake passage 31, this passage receives atmospheric air from an air inlet device (not shown) in which a manually operated throttle control valve is positioned. This air inlet device, in turn, supplies an intake manifold shown partially and identified by the reference numeral 34 which is affixed to the cylinder head 24 in a manner which will be described.

The manifold 34 has individual runners 35 which are formed initially as a common passage portion 36 that is, then, divided into a pair of passage portions 37 and 38 by means of an internal wall 39.

A control valve assembly, indicated generally by the reference numeral 41 is interposed between the manifold runners 34 and an external surface 42 of the cylinder head 24 that forms the inlet opening for the cylinder head intake passage 31. The purpose and function of the control valve assembly 41 will be described later.

However, it should be noted that it is divided into a pair of passage portions 44 and 45 by an internal wall 46 which mates with and forms an extension of the manifold runner wall 39 for a reason which will also be described. The control valve assembly 41 includes a main body portion 47 in which the openings 44 and 45 are formed. This main body portion 47 is sandwiched between the manifold runners 34 and the cylinder head surface 43. These elements are affixed to each other by suitable fasteners (not shown).

The cylinder head intake passage 31 is divided into three portions comprised of a first side passage portion 48 which terminates in a first side intake valve port or valve seat 49. As may be best seen in FIG. 2, this valve seat or port 49 is disposed on one peripheral edge of the cylinder bore 23 and extends at least in part over the plane 29 that contains the cylinder bore axis 28.

The side intake passage portion 48 is formed adjacent to a center intake passage portion 51 which is divided from the passage portion 48 by an internal wall 52 of the cylinder head. The center intake passage portion 51 terminates in a center intake valve port or valve seat 53. This port or valve seat 53 is spaced further from the plane 29 than the first side valve seat 49 and is generally in line with the cylinder bore axis 28.

A final, second side intake passage portion 54 lies on the other side of the center intake passage portion 51 and is separated therefrom by an internal wall 55 of the cylinder head 24. This side intake passage portion 54 terminates at a second side intake valve seat or port 56. This valve seat or port 56 slightly overlies the center plane 29 and thus the center intake valve seat 53 is disposed between the side intake valve seats or ports 49 and 56.

First and second side popper type intake valves, indicated by the reference numerals 57 and 58, have their stem portions slidably supported in the cylinder head 24 in a known manner, as by valve guides 59. These side intake valves 57 and 58 have their head portions sized and configured so as to effect a seal with the respective side intake valve seats or ports 49 and 56. The axes of reciprocation of the side intake valves 57 and 58 lie in a common plane, this plane being indicated by the reference numeral 61 in FIG. 1. This plane is disposed at an acute angle, $\theta_s$ to the plane 29 containing the cylinder bore axis 28.

A center intake valve, indicated generally by the reference numeral 62 is also reciprocally supported in the cylinder head assembly 29 by a valve guide (not shown). The head of the center intake valve seat 61 is sized and configured so as to cooperate with the center valve seat 53 so as to control its opening and closing. The reciprocal axis of the center intake valve 61 lies in a plane 62 that is disposed also at an acute angle $\theta_c$ to the cylinder bore axis containing plane 29. This acute angle $\theta_c$ is less than the acute angle $\theta_s$ of the plane 61 that contains the axis of reciprocation of the side intake valves 57 and 58.

Each of the intake valves 57, 58, and 61 is urged to its closed position by a respective coil compression spring 64, only one of which appears in the drawings. The springs 64 act against machined surfaces 65 formed on the cylinder head 24 and keeper retainer assemblies that are fixed to the upper ends of the stems of the respective valves 57, 58, and 61. A thimble-type tappet 66 is slidably supported in a respective bore 67 of the cylinder head 24 and cooperates with the stems of the valves 57, 58, and 61 for operating the valves and controlling their positions.

An intake camshaft, indicated generally by the reference numeral 68 is rotatably journaled in the cylinder head 24 in any suitable manner and has individual lobes that cooperate with the thimble tappet 66 for operating the respective valves 57, 58, and 61. The intake cam shaft 68 is driven by the engine crankshaft through any suitable timing drive so that it will rotate at one-half crankshaft speed, as is well known in this art.

A pair of exhaust ports or exhaust valve seats 69 are formed in the cylinder head recess 27 on the side of the plane 29 opposite to the intake valve seats or ports 49, 53, and 56. These exhaust valve seats or ports 49 feed short exhaust passage portions 71 of the common exhaust passage 32 that opens through an outer face 72 of the cylinder head. These passage portions 71 are separated from each other by a short wall 73 that is formed integrally within the cylinder head 24.

A pair of poppet type exhaust valves 74 are supported for reciprocation within the cylinder head 24 by valve guides 75. These exhaust valves 74 have head portions that cooperate with the valve seats 69 for controlling the flow therethrough. These reciprocal axes lie in a common plane that is disposed at a greater acute angle to the plane 29 than the angle $\theta_c$ of the center intake valve 62 and one which is less than or equal to the angle $\theta_s$ of the side intake valves 57.

The exhaust valves 74 are urged to their closed positions by coil compression spring 76 that act against machined surfaces 77 of the cylinder head 24 and keeper retainer assemblies that are affixed to the stems of the exhaust valves 74. Thimble tappets 77 are supported within bores 78 of the cylinder head 24 and associated with the stems of the exhaust valves 74 for their actuation.

An exhaust camshaft 79 is rotatably journaled within the cylinder head 24 about an axis parallel to the axis of the intake camshaft 68 and has lobes that cooperate with the thimble tappet 77 for actuating these tappets and the associated exhaust valve 74. The exhaust camshaft 79 is also driven at one-half crankshaft speed by any suitable timing mechanism which may be the same as that which drives the intake camshaft 68. A cam chamber 81 is formed by the upper portion of the cylinder head 24 and a cam cover 82 that is affixed thereto and which contains the camshaft 68 and 79.

As may be seen in FIG. 2, hold-down studs 83 that affix the cylinder head 24 to the cylinder block 22 are disposed at equal distances from the cylinder bore axis 28 and outwardly of the intake and exhaust passages 31 and 32 for each cylinder. Hence, good hold-down capability is provided without interfering with the large effective size of the intake and exhaust passages 31 and 32.

Because of the large size of the intake passage 31 and the large effective area provided by the three intake valve seats 49, 53, and 56 the engine has good breathing capability and can attain high power outputs. However, and for the reasons aforenoted, this arrangement will produce poor running under low speed/low load conditions.

The control valve assembly 41 is provided so as to restrict the flow through the center intake valve seat 53 and the second side intake valve seat 56 under low speed and mid-range running in order to not only increase the velocity of the charge that flows into the combustion chamber 27 but also so as to generate a tumble and swirl action thereto.

To this end, the control valve assembly 41 includes a valve shaft 84 that passes through the passages 44 and 45 formed in the valve body 47. Affixed to this control valve shaft 84 and only within the passage portion 45 is a butterfly type control valve 85. The butterfly type control valve 85 has a configuration so that when it is in its closed position, as shown in FIG. 1, the total flow area of the passage 45 is obstructed and all of the airflow, except as will be hereinafter noted, enters the combustion chamber through the first side intake port 49.

Thus, by reducing the effective flow area the velocity of the intake charge is substantially increased. In addition, since the first side intake valve seat 49 is disposed close to the plane 29, the charge will flow across the combustion chamber, strike the cylinder wall, and be deflected downwardly where it will strike the head of the piston and be deflected back in the reverse direction so as to generate a clockwise tumble motion as best seen in the direction of FIG. 1. This tumble motion is also seen better in FIG. 15.

In addition, since the charge is entering at one side of the cylinder bore 23, there will be some swirl component generated about the cylinder bore axis 28 to effect which is referred to as a slant/tumble action. This improves the turbulence in the combustion chamber and will improve flame propagation when running at low speeds and when the control valve 85 is closed.

The control valve body 47 is also provided with a nozzle port 86 that receives a fuel injector 87 of any type such as a solenoid operated type injector 87. This fuel injector receives fuel from a fuel rail 88 and suitable fuel source. The nozzle port 86 enters a recessed area 89 formed in the cylinder head and specifically the side intake passage portion 48 thereof so that the fuel will be directed primarily toward the side intake valve seat 49. As a result, when the engine is running at low speeds and low loads, the fuel will be swept primarily through this valve seat 49 and because of the swirl/tumble motion will effect some stratification of the charge which will be directed toward the center of the cylinder bore axis 28 and toward the gap of the spark plug 33 by the slant/tumble motion. Thus, the engine can be operated with what amounts to a nonhomogeneous fuel/air mixture or a lean charge.

As the engine speed increases above off idle, the airflow through the intake valve seat 49 may be somewhat restricted. Therefore, and to provide a more homogenous mixture of the fuel under this running condition, a communication port 91 is formed in the wall 52 that separates the side intake passage portion 48 from the center intake passage portion 51. This opening 91 is disposed downstream of the nozzle port 86 through which the fuel injector 87 discharges and upstream of the valve seat 53. As a result and since the airflow is otherwise restricted through the center intake passage portion 51, there will be a high velocity of airflow drawn through the opening 91 from the valve body opening 44 and the upstream portion of the side intake passage portion 48. This high flow velocity will sweep some of the fuel issuing from the injector 87 also through this opening 91 as shown in FIG. 2. This increases the amount of fuel distribution and also provide better stratification control and assurance that a rich fuel/air mixture will be present at the gap of the spark plug 33 when it is fired.

As the speed and load on the engine increases the control valve 85 is opened so as to permit more airflow to the engine through remaining valve seats 53 and 56 and to provide adequate airflow and reduced turbulence. Any suitable servo mechanism can be connected to the control valve shaft 84 for this operation and any type of ECU can be provided for determining the actual strategy. Basically, the concept is to keep the valve 85 closed at low speed and low mid-range and then open it as the engine speed and load increases, as already described.

FIGS. 3 through 10 show another embodiment of the invention which is generally similar to the embodiment of FIGS. 1 and 2. Where the construction of this embodiment is the same or substantially the same as the previously described embodiment, its description will not be repeated, except insofar as is necessary to understand the construction of an operation of this embodiment and the same reference numerals have been applied to identify similar components in this embodiment.

This embodiment differs from the previously described embodiment primarily in the configuration of the intake passage, indicated generally by the reference numeral 101 in this embodiment. In this embodiment, a first side intake passage portion 102 serves the first side intake valve seat or port 49 that is controlled by the first side intake valve 57. Like the previously described embodiment, this passage portion 102 is divided from the remaining intake passage portions by a wall 103 formed integrally with the cylinder head 24. In this embodiment, however, the wall 103 is not provided with any opening, although one may be provided if desired.

Like the previous embodiment, a center intake passage portion 104 serves the center intake valve seat or port 53 which is controlled by the center intake valve 61. A second side intake passage 105 serves the remaining or second side intake valve port or seat 56 controlled by the second side intake valve 85. Unlike the previous embodiment, however, the center and second side intake passages 104 have a common inlet portion 106 before they are divided by a dividing wall 107. The wall 107 terminates relatively closely to the valve seats or ports 53 and 56 but in an area where the configuration of the passage portions 104 and 105 are different as may be best seen in FIGS. 5 through 8.

Each of the intake passage portions 102, 104 and 105 has an upper wall that defines two different shaped portions comprised of a first portion, each indicated by the subscript 1 that extends at an acute angle to the plane 28 which plane is shown displaced in these figures so that the angle can be more clearly seen. This portion extends from the opening in the outer cylinder head surface 43 and then curves into a straight second portion which leads up to the respective valve seat, these straight portions being indicated by the subscript 2.

Each of the portions 102, 104 and 106 is configured so that the upper wall portion 102-1, 104-1 and 105-1 is at a different angle relative to the plane 28 or so that its straight portion 102-2, 104-2 or 105-2 is different. Specifically, the two side intake passages 102 and 105 have significantly different configurations as may be best seen in these figures even though their position in the cylinder bore is substantially the same or similar. Considering first the configuration of the first or primary intake passage portion 102, it will be seen that its upper wall surface 102-1 is disposed at a relatively shallow acute angle $\theta_{s-1}$ to the plane 28 and its straight section 102-2 has a relatively short length L-1 as seen in this figure. As a result, the airflow this intake passage 102 will be directed primarily toward the side of the valve seat 49 closest to the plane 28 and the airflow through this intake port when the intake valve 57 is open will be directed primarily toward the other side of the cylinder so as to create a greater tumble motion. The center intake passage portion 104 has its upper surface 104-1 disposed at a somewhat lesser acute angle than the passage portion 102-1 and its straight portion 104-2 longer. As a result, the air will be turned more through this intake passage 104 and directed more in an axial direction along the cylinder when this is delivering a charge to the cylinder.

The remaining or second side intake passage 102 has its upper wall portion 105-1 disposed at an angle $\theta_{s2}$ that is substantially greater than that of the first intake passage portion but its straight portion 105-2 is substantially longer as shown by the dimension $L_{-2}$. As a result, the air flowing into the combustion chamber through this passage will be more in an axial direction so as to complement that airflow through the center intake passage portion 104 and establish a more axial flow when a charge is entering the combustion chamber through these passage portions.

As a result, when operating at low speed and low load and when the control valve 85 is in its closed position, there will be a substantial tumble motion generated in the combustion chamber. When the control valve 85 is open, however, the flow would be more axial in nature and there will be no tumble.

Figure 9:
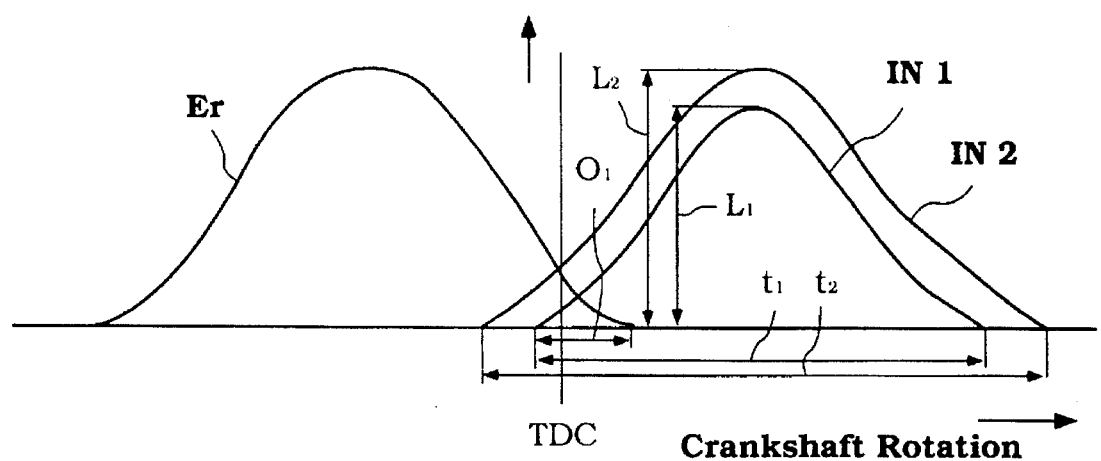
FIG. 9 is a graphical view showing how the lift of the intake and exhaust valves in this embodiment are related.

In order to further improve the turbulence and to improve low speed running, the side intake valve 57 has a lesser lift and shorter duration then the center intake valve 61 and the remaining side intake valve 58 as seen in FIG. 9. The lift $L_1$ of the first side intake valve 57 is less than that lift $L_2$ of the center intake valve 61 and the second side intake valve 58. The duration of opening t1 is also less than the duration t2 of the opening of the remaining valves.

As seen in FIG. 9, the overlap $O_1$ between the exhaust valve timing and that of the first side intake valve 57 is substantially less so that there will be better and smoother running at low speed and low load.

This results in a torque curve as shown at t1 in FIG. 2 which, it will be seen, is better than the torque curve t3 under the low speed, low load condition of a conventional engine.

Figure 10:
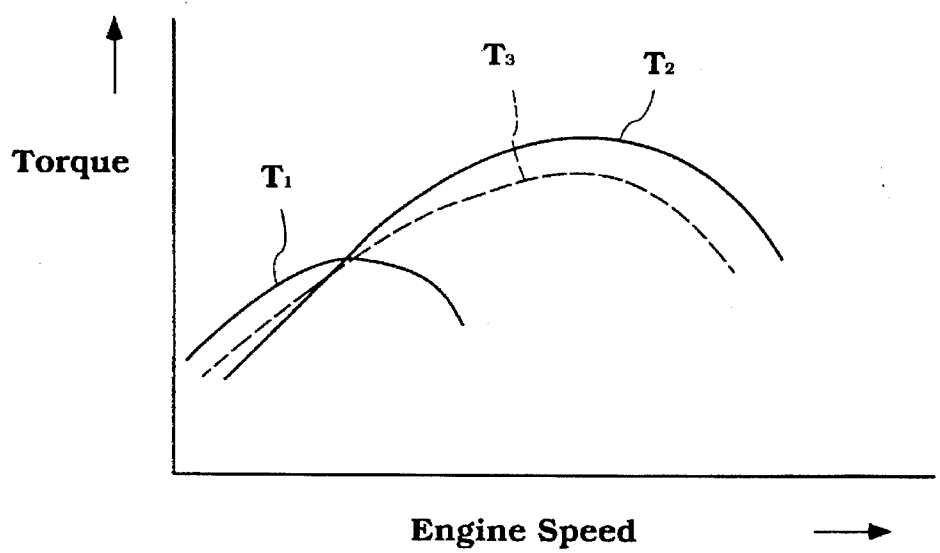
FIG. 10 is a graphical view showing the torque curves of this embodiment and the prior art in relation to engine speed.

However, the greater lift of the center intake valve 61 and the remaining side intake valve 58 can provide a longer overlap without decreased performance as shown by the torque curve t2 in FIG. 10. This type of an arrangement could not be utilized with a conventional engine because the low speed running would deteriorate significantly. Thus, the invention in addition to providing improved low speed performance is capable of increasing the high speed performance without deterioration of the low speed performance.

In the embodiments of the invention as thus far described the primary or first side intake passage 52 or 102 has served the low speed low load requirements while the remaining two intake passage portions comprising the center intake passage portion 52 or 104 and the second side intake passage portion 54 and 105 have been brought into play in mid-range and high speed performance. These induction systems lend themselves to an arrangement where there is a substantial improvement in performance at low speed but some sacrifice in mid-range. In addition and in the embodiment of FIGS. 3 through 10 the situation has been such that fuel is injected primarily only through the one primary intake passage portion 102.

Figure 11:
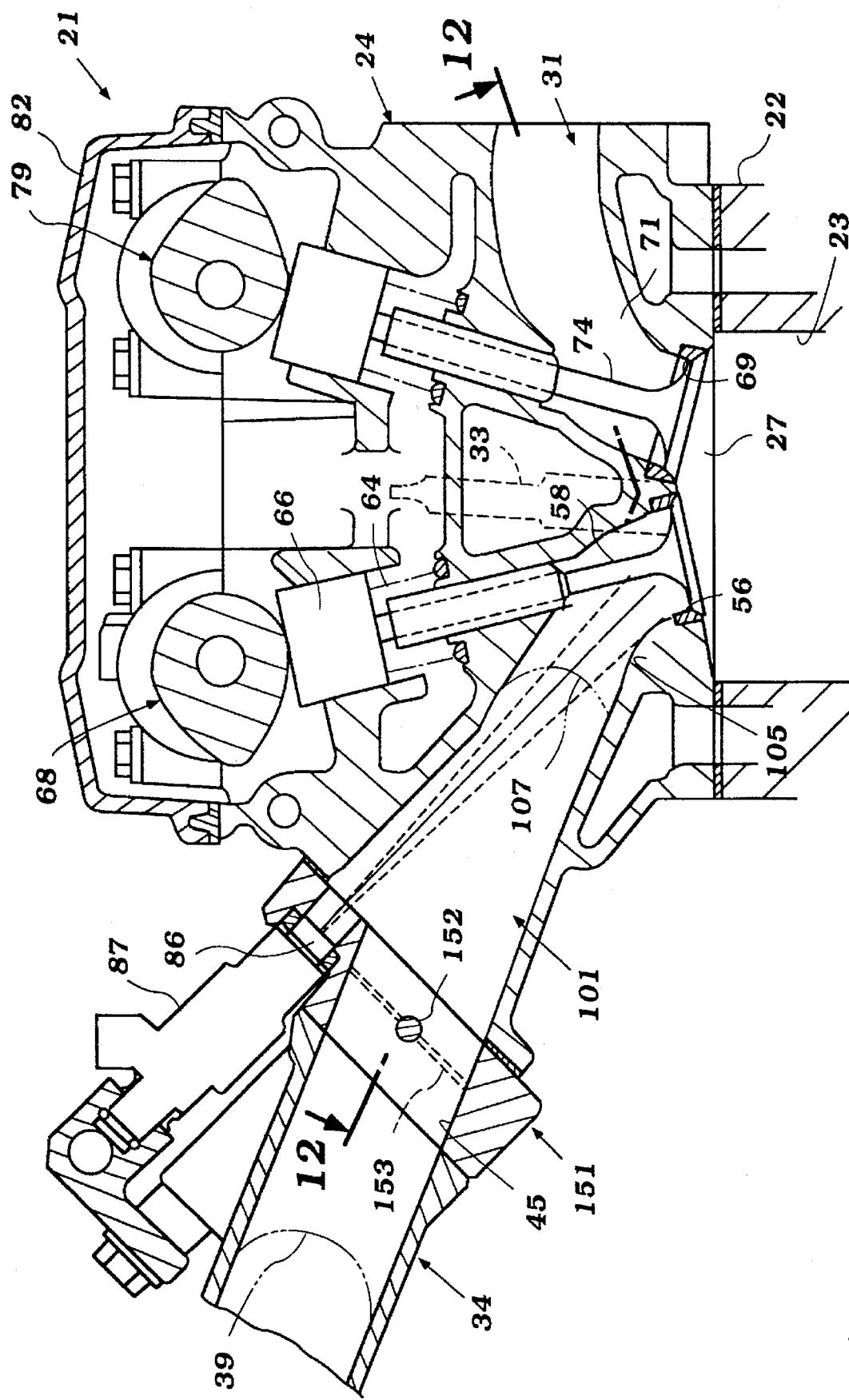
FIG. 11 is a cross-sectional view, in part similar to FIGS. 1 and 3 and shows a still further embodiment of the invention and is taken generally along the line 11—11 of FIG. 12.
Figure 12:
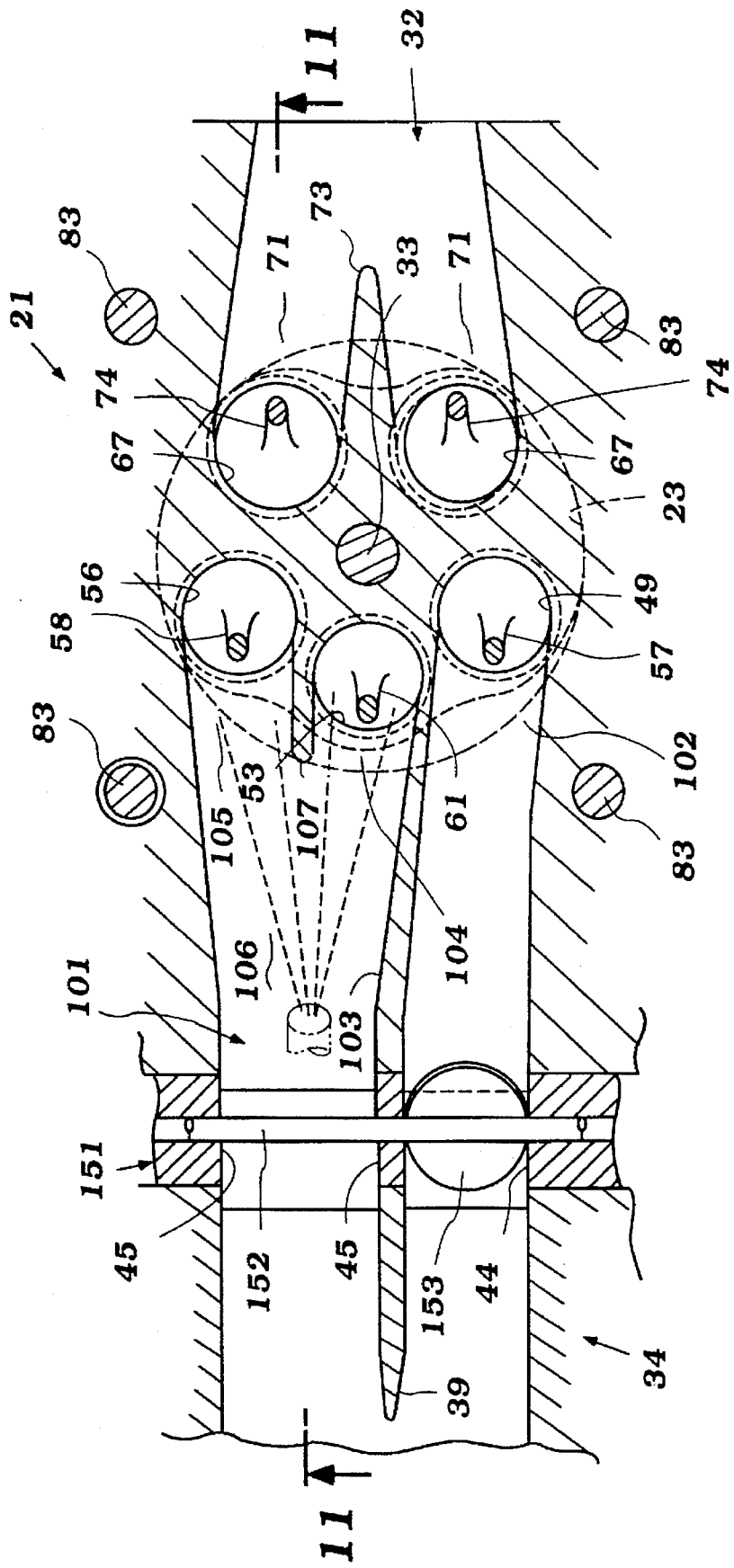
FIG. 12 is a cross-sectional view, in part similar to FIGS. 2 and 4 and is taken along the line 12—12 of FIG. 11.

FIGS. 11 and 12 show another embodiment which is the same as the embodiment of FIGS. 3 through 10 but the control valve arrangement is changed so that the primary or low speed running is by the second side intake passage 105 and center intake passage 104 and only the first side intake passage 102 is added under high speed high load conditions. In addition, the fuel injector port 86 is disposed in the common portion 106 of the intake passage portions 104 and 105. Since these are the only differences, components which are otherwise the same have been identified by the same reference numerals and will not be described again.

In this embodiment the control valve assembly, indicated generally by the reference numeral 151 again has the two intake passage portions 44 and 45 which are separated by the integral wall 39 of the manifold runner 34 and the wall 45 of the body portion 47 of the control valve 151.

A control valve shaft 152 is journaled in the valve body 41 and carries a butterfly type throttle valve 153 that controls the flow through the passage 44 and, accordingly, the flow to what has been previously regarded as the first side intake port or seat 49. Again, the strategy is that the control valve 153 is maintained in a closed position until the engine speed and load is high enough to demand increased flow and more charge. However, since the primary intake passage comprised of the portions 104 and 105 is greater in cross-sectional area than that previously employed, it is possible to delay the opening of the control valve 153 until a later time than would the previously described embodiments.

Figure 13:
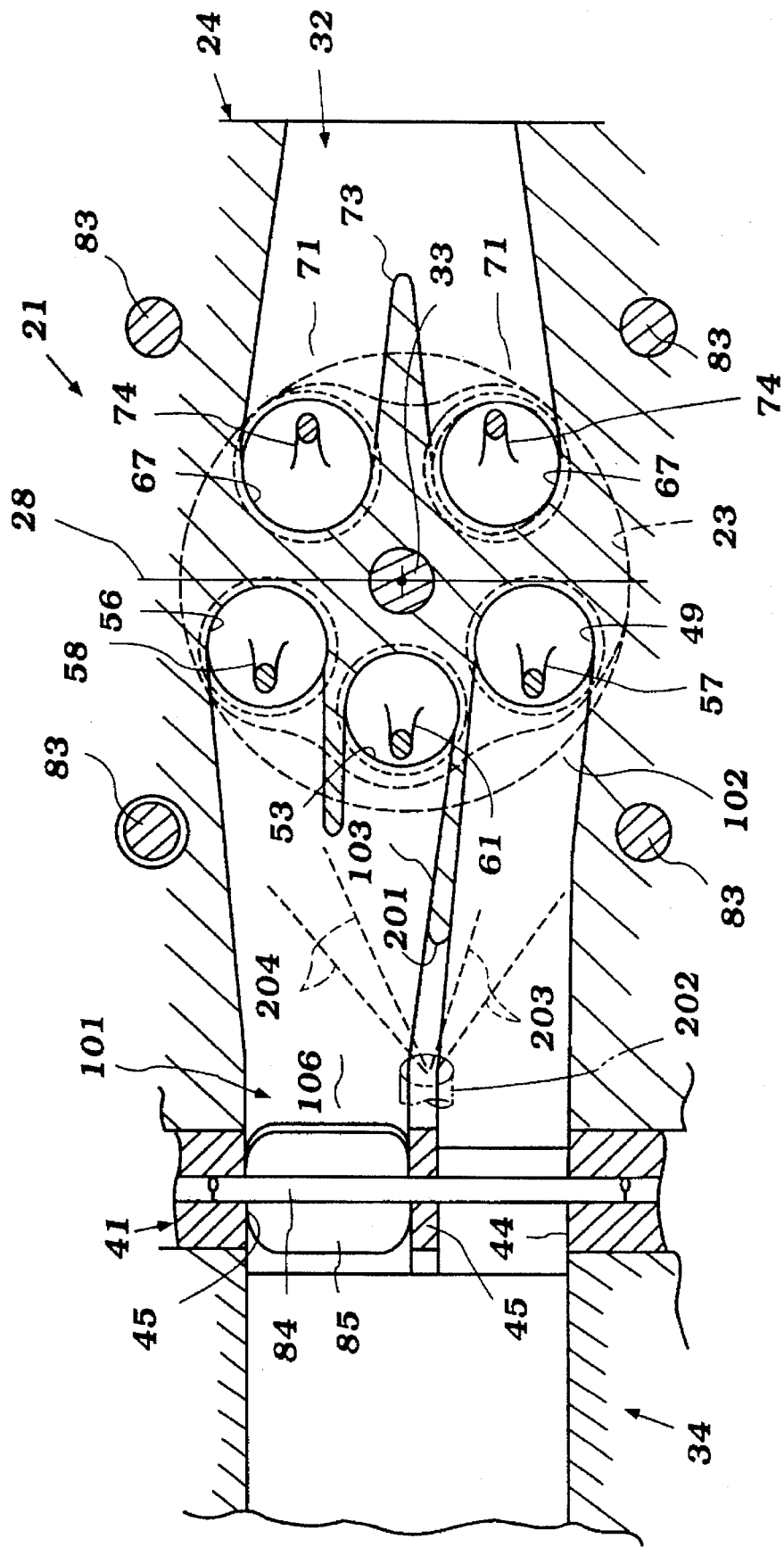
FIG. 13 is a cross-sectional view, in part similar to FIGS. 2, 4, and 12 and shows a still further embodiment of the invention.

FIG. 13 shows another embodiment of the invention which is generally similar to the embodiment of FIGS. 3 through 10. For that reason, components of this embodiment which are the same as that embodiment have been identified by the same reference numerals and will not be described again, except as insofar as is necessary to understand the construction and operation of this embodiment. This embodiment differs from those previously described from that of FIGS. 3 through 10 in that the dividing wall 103 is, in this embodiment, provided with a communication opening indicated generally by the reference numeral 201. In this embodiment, a fuel injector, indicated schematically at 202 is provided that has a pair of nozzle ports that provide a spray pattern as indicated by the reference numerals 203 and 204 with each spray going into either the intake passage portion 102 or into the common portion 106 which serves the intake passage portions 104 and 105. Therefore, this embodiment will provide a more homogeneous fuel air mixture under wide open throttle conditions than the previous embodiments wherein the fuel spray has been confined to one or at the most two of the intake passage portions.

Figure 14:
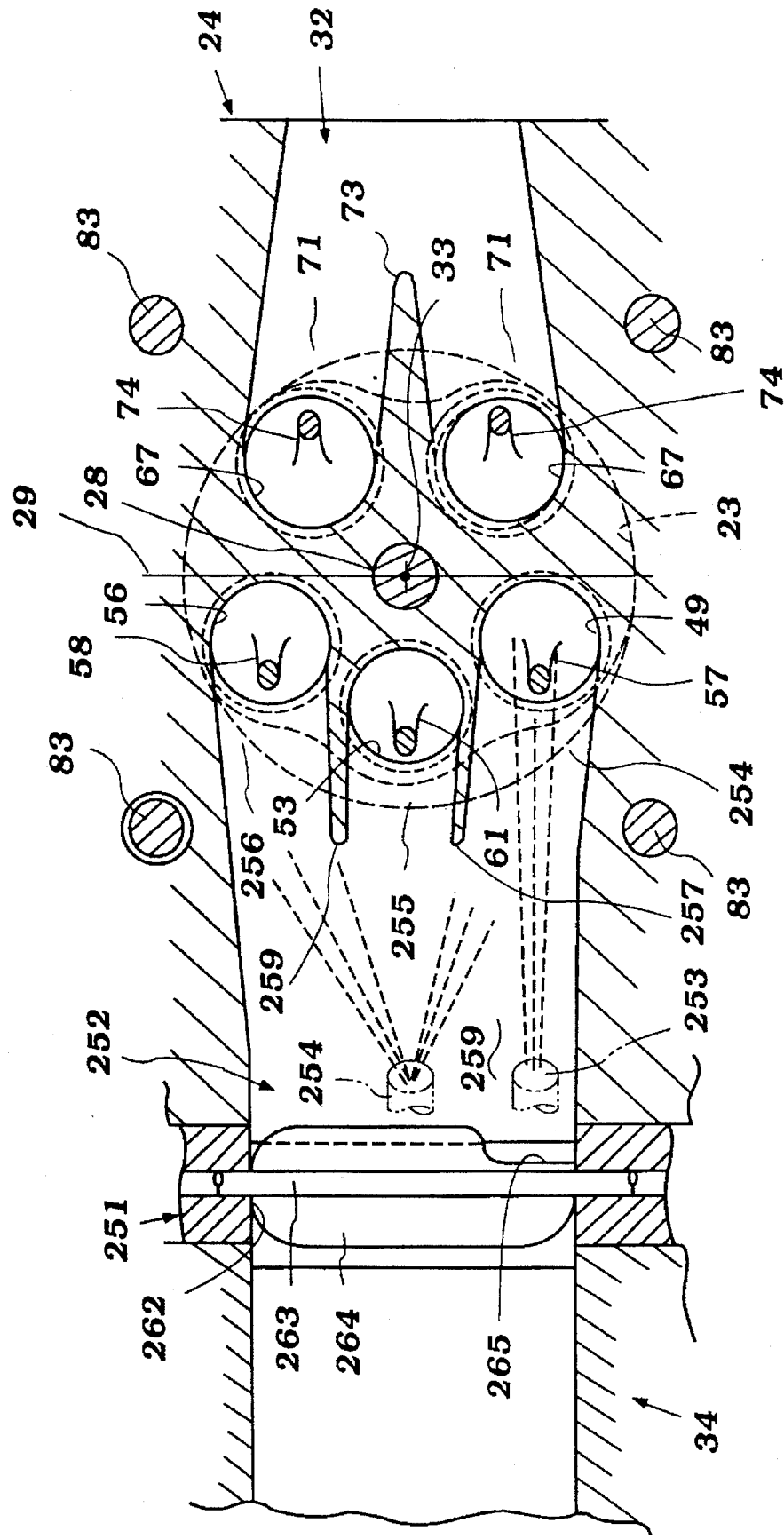
FIG. 14 is a cross-sectional view, in part similar to FIGS. 2, 4, 12, and 13 of a yet further embodiment of the invention.

FIG. 14 shows another embodiment of the invention which differs from the previously described embodiments in three regards. These have to do with the shape and operation of the control valve, indicated by the reference numeral 251, the shape and formation of the intake passage, indicated generally by the reference numeral 252 and the number and type of fuel injectors, indicated by the reference numerals 253 and 254. In all other regards, this embodiment is the same as those previously described and thus where components of this embodiment are the same as those previously described or substantially the same as them, they have been identified by the same reference numerals and will not be described again.

In this embodiment, the three intake passage portions that serve the intake valve seats or ports 49, 53 and 56 are indicated respectively by the reference numerals 254, 255 and 256. These portions are separate by relatively short walls 257 and 258 so as to provide a relatively large common communicating area 259 upstream of them and downstream of the control valve 251. The fuel injector 253 has a single spray nozzle that is directed primarily toward the first side intake valve seat or port 49. The spray nozzle 254 is located more centrally in the common portion 259 and has two spray ports one directed primarily toward the second side intake passage portion 256 and the other of which is directed primarily toward the first side intake passage portion 254.

The control valve 251 is comprised of a control valve body 261 having a single generally oval-shaped opening 262 across which a control valve shaft 263 passes. The control valve shaft 263 has a plate-type valve element 264 affixed to it which generally has a configuration complementary to that of the opening 262 so that when the control valve element 264 is closed the air flow passage provided by the opening 262 will be substantially obstructed. However, there is provided a small cut-out 265 on the upper portion of the control valve plate 264 which will permit air to flow through this side of the common intake opening 259 and primarily toward the side intake passage portion 254 when the valve is in its closed flow restricting position. In this position, the airflow will be directed primarily toward the upper or far side of the intake valve seat or port 49 to further augment the tumble action. Thus, in this embodiment the control valve additionally provides tumble control for this port which exists primarily only when the control valve 264 is in its low speed condition.

In this low speed running and when the control valve 264 is closed, only the injector 253 discharges fuel. As the speed and load increases and the control valve 264 is opened, then the injector 254 is operated so that it will also discharge fuel. At this time, the discharge from the first injector 253 may be discontinued if desired.

Figure 15:
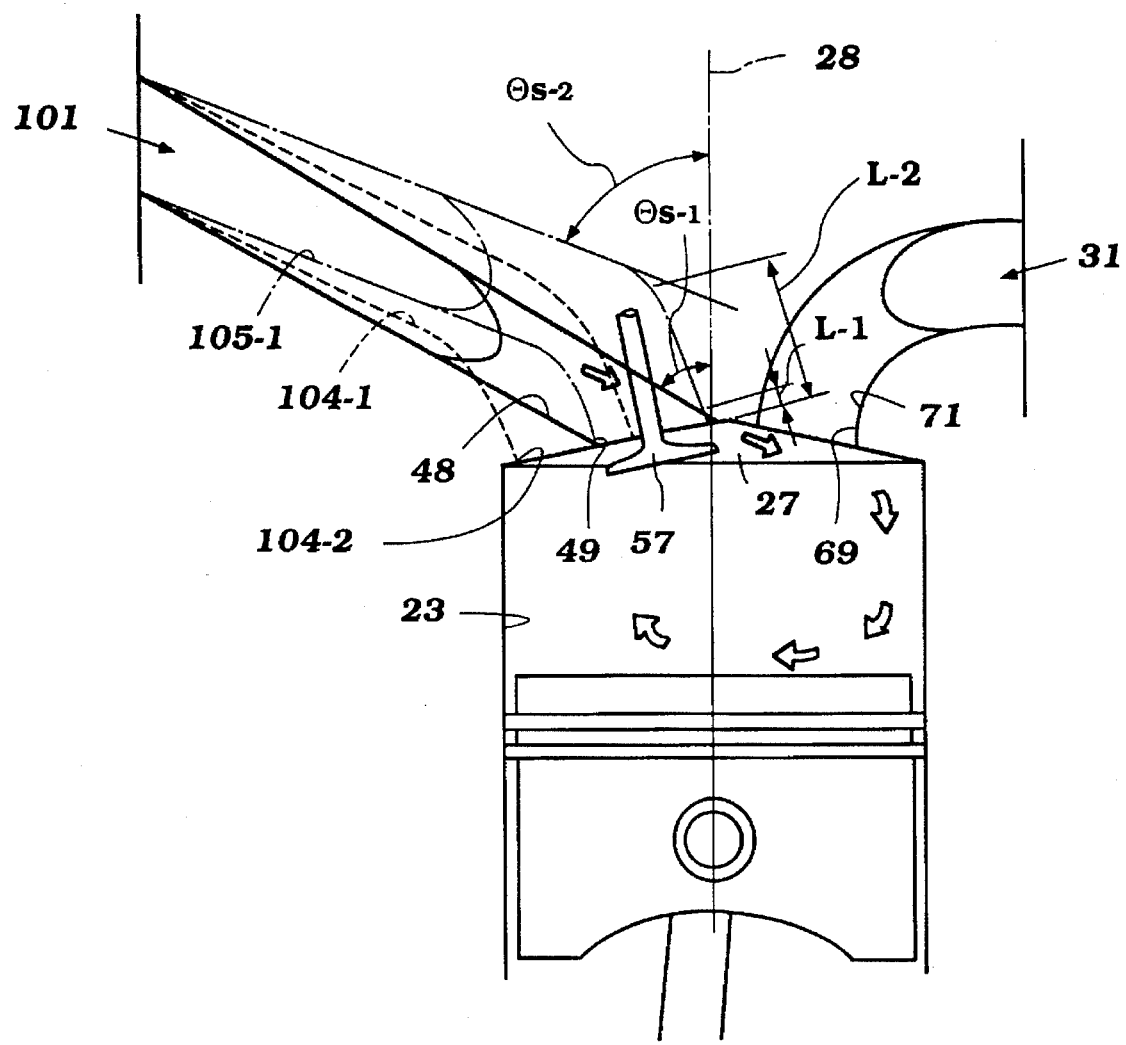
FIG. 15 is a partially schematic cross-sectional view taken through a single cylinder of the engine and showing how the airflow pass exists in the cylinder under certain conditions.

Description has been made of the tumble motion although it has not been illustrated in any of the figures up until this point. FIG. 15 is a somewhat composite view which may be considered to be a typical view for all of the embodiments, although some of the attributes of embodiment of FIGS. 3 through 10 appear in this figure. This shows the situation when running at low speed and low load condition wherein the tumble is generated. The air flow through the first side intake passage or the one side intake passage in the embodiment of FIGS. 11 and 12 will be seen to be directed primarily across the cylinder bore so that it will strike the cylinder bore, be deflected downwardly and then backwardly in a tumbling motion around an axis that extends perpendicularly to the cylinder bore axis 28. As has been previously noted, the advantage of this type of tumble motion is that as the piston approaches its top dead center position, the path that the air must traverse becomes less and accordingly the speed becomes higher. Therefore, this type of motion is particularly advantageous in assuring high turbulence at the time of spark plug firing, if that is a desirable result for the particular engine configuration.

Thus, from the foregoing description it should be readily apparent that the described embodiments provide very effective induction systems that can be relatively simple in construction and which will nevertheless provide good running over wide engine speed and load ranges. Of course, the foregoing description is that of preferred embodiments of the invention and various changes in modifications may be made without departing from the spirit and scope of the invention, as defined by the appended claims.

What is claimed is:

1. An internal combustion engine having a combustion chamber served by at least two intake ports, a pair of intake passages separated by a wall each of which terminates at a respective one of said intake ports, a fuel injector positioned to discharge fuel into only one of said intake passages in a direction generally along the flow axis of said one intake passage, an opening formed in said wall and extending between said intake passages at a point upstream of said intake ports and downstream of the point of discharge of said fuel injector, and a control valve in said other intake passage for restricting the flow therethrough upstream of said wall opening for causing at least some of the airflow through said one intake passage to pass through said opening and sweep some of the fuel injected by said fuel injector into the other of said intake passages.

2. An internal combustion engine as set forth in claim 1, wherein the intake passages are formed by a cylinder head having a recess in which the intake ports are formed and which defines with an associated cylinder bore and piston in the combustion chamber.

3. An internal combustion engine as set forth in claim 2, wherein the intake passages terminate in an opening in an exterior surface of the cylinder head and wherein the control valve is comprised of a valve body and movably supported valve element contained therein which is affixed to said cylinder head surface.

4. An internal combustion engine as set forth in claim 3, wherein the control valve body defines a pair of openings each in registry with and complementary to a respective one of the intake passages.

5. An internal combustion engine as set forth in claim 4, wherein the control valve is positioned only in the opening in the valve body that communicates with the other intake passage of the cylinder head.

6. An internal combustion engine as set forth in claim 5, wherein the control valve comprises a butterfly type valve.

7. An internal combustion engine as set forth in claim 1, wherein there are at least three intake ports serving the combustion chamber, two of said intake ports comprising side intake ports lying closer to a plane passing through the center of the combustion chamber than the third intake port which third intake port comprises a center intake port and is disposed between the side intake ports.

8. An internal combustion engine as set forth in claim 7, wherein the intake passages are formed by a cylinder head having a recess in which the intake ports are formed and which defines with an associated cylinder bore and piston in the combustion chamber.

9. An internal combustion engine as set forth in claim 8, wherein the intake passages terminate in an opening in an exterior surface of the cylinder head and wherein the control valve is comprised of a valve body and movably supported valve element contained therein which is affixed to said cylinder head surface.

10. An internal combustion engine as set forth in claim 9, wherein the control valve body defines a pair of openings.

11. An internal combustion engine as set forth in claim 10, wherein the control valve is positioned only in the opening in the valve body that communicates with the center and one of the side intake passages of the cylinder head.

12. An internal combustion engine as set forth in claim 11, wherein the control valve comprises a butterfly type valve.

13. An internal combustion engine as set forth in claim 7, wherein the intake passage that serves the center intake valve port and one of the side intake valve ports is divided into a pair of intake passage portions by a separating wall.

14. An internal combustion engine as set forth in claim 13, wherein the separating wall extends to a point contiguous to the control valve.

15. An internal combustion engine as set forth in claim 7, wherein each of the intake passages is comprised of a first portion that extends at an acute angle to the plane and which terminates at a second section which extends in a generally straight direction perpendicular to a plane containing the respective intake port, at least one of the acute angles and length of the second section of at least one of the side intake passages being different from that of the other side intake passage.

16. An internal combustion engine as set forth in claim 15, wherein both the acute angle and length of the second section of one of the side intake passages are different from those of the other of the side intake passages.

17. An internal combustion engine as set forth in claim 16, wherein the acute angles of all of the intake passages and lengths of the second sections of all of the intake passages are different from each other.

18. An internal combustion engine having a combustion chamber formed at least in part by a cylinder block having a cylinder bore, a piston reciprocating in said cylinder bore, and a cylinder head having a recessed surface facing and closing said cylinder bore, three intake ports formed in said recess for admitting a charge into said combustion chamber comprised of a center intake port spaced from a plane containing the axis of said cylinder bore and first and second side intake ports formed on opposite sides of said center intake port and positioned closer to said plane than said center intake port, said intake ports being each served by a respective intake passage which has a first portion that extends at an acute angle to said plane and a second portion extending from the termination of said first portion to the respective intake port and which extends generally perpendicularly to said intake port, at least one of the acute angle of the first portion and length of the second section of one of said side intake passages being different than that of the other of the side intake passages.

19. An internal combustion engine as set forth in claim 18, wherein both the acute angle and length of the second section of one of the side intake passages are different from those of the other of the side intake passages.

20. An internal combustion engine as set forth in claim 19, wherein the acute angles of all of the intake passages and lengths of the second sections of all of the intake passages are different from each other.

21. An internal combustion engine as set forth in claim 18, further including a control valve positioned in at least one of the intake passages for controlling the flow therethrough.

22. An internal combustion engine as set forth in claim 21, wherein the control valve controls the flow through the intake passage serving the center intake valve port and one of the side intake valve ports.

23. An internal combustion engine as set forth in claim 22, further including a fuel injector for injecting fuel into at least one of the intake passages.

24. An internal combustion engine as set forth in claim 23, wherein the fuel injector sprays fuel into an intake passage that is not controlled by the control valve.

25. An internal combustion engine as set forth in claim 23, wherein the fuel injector sprays fuel into the intake passage in which the control valve is positioned.

26. An internal combustion engine as set forth in claim 25, further including a second fuel injector for spraying fuel into the intake passageway that the control valve does not control.

27. An internal combustion engine as set forth in claim 26, wherein the first fuel injector injects fuel only when the control valve is in a closed position.

28. An internal combustion engine having a combustion chamber formed at least in part by a cylinder block having a cylinder bore, a piston reciprocating in said cylinder bore, and a cylinder head having a recessed surface facing and closing said cylinder bore, three intake ports formed in said recess for admitting a charge into said combustion chamber comprised of a center intake port spaced from a plane containing the axis of said cylinder bore and said first and second side intake ports formed on opposite sides of said center intake port and positioned closer to said plane than said center intake port, a first intake passage extending through said cylinder head and terminating at said first side intake port, a second intake passage extending through said cylinder head in side-by-side relationship to said first intake passage and terminating at said center intake port and said second side intake port, said first and said second intake passages being separated by a wall of said cylinder head, an opening in said wall, and a fuel injector having a discharge nozzle disposed contiguous to said opening and spraying the fuel through said opening into each of said intake passages.

29. An internal combustion engine as set forth in claim 28, further including a control valve positioned in at least one of the intake passages for controlling the flow therethrough.

30. An internal combustion engine as set forth in claim 29, wherein the control valve controls the flow through the intake passage serving the center intake valve port and one of the side intake valve ports.

31. An internal combustion engine having a combustion chamber formed at least in part by a cylinder block having a cylinder bore, a piston reciprocating in said cylinder bore, and a cylinder head having a recessed surface facing and closing said cylinder bore, three intake ports formed in said recess for admitting a charge into said combustion chamber comprised of a center intake port spaced from a plane containing the axis of said cylinder bore and said first and second side intake ports formed on opposite sides of said center intake port and positioned closer to said plane than said center intake port, intake passage means extending through said cylinder head and terminating at said intake ports for delivering a charge to said combustion chamber, and first and second fuel injectors for spraying fuel into said intake passage means, each of said fuel injectors having a spray pattern different from the other.

32. An internal combustion engine as set forth in claim 31, wherein the intake passage means comprises a center intake passage portion serving the center intake port, and first and second side intake passage portions serving the first and second side intake ports, respectively.

33. An internal combustion engine as set forth in claim 32, wherein the center intake passage portion and the side intake passage portions all having a common portion upstream thereof into which the fuel injectors inject.

34. An internal combustion engine as set forth in claim 33, wherein the first fuel injector has its spray pattern directed primarily toward the first side intake port and the second fuel injector has a pair of nozzle ports each spraying fuel toward a respective one of the side intake ports.

35. An internal combustion engine as set forth in claim 34, further including a control valve positioned in at least one of the intake passages for controlling the flow therethrough.

36. An internal combustion engine as set forth in claim 35, wherein the control valve in a closed position substantially closes the flow path to the second side intake port and the center intake port and wherein the second fuel injector is not operated when the control valve is in its closed position and wherein the first fuel injector is not operated when the control valve is in its opened position.

37. An internal combustion engine as set forth in claim 36, wherein the control valve in its closed position also redirects the flow to a different area of the first side intake port and restricts the flow to the first side intake port.

* * * * *